United States Patent [19]

Yamashita et al.

[11] 4,312,572
[45] Jan. 26, 1982

[54] FOCUSING OBJECTIVE LENS SYSTEM FOR ENDOSCOPES

[75] Inventors: Nobuo Yamashita, Tama; Miwako Maeda, Hino, both of Japan

[73] Assignee: Olympus Optical Co., Ltd., Tokyo, Japan

[21] Appl. No.: 107,639

[22] Filed: Dec. 27, 1979

[30] Foreign Application Priority Data

Dec. 29, 1978 [JP] Japan .................... 53-164039

[51] Int. Cl.³ .............................. G02B 9/62
[52] U.S. Cl. ..................... 350/423; 350/464; 350/476
[58] Field of Search ............. 350/423, 464, 475, 476

[56] References Cited

U.S. PATENT DOCUMENTS 3,994,572 11/1976 Uesugi ..................... 350/423
4,118,108 10/1978 Muszumanski ............ 350/423

*Primary Examiner*—John K. Corbin
*Assistant Examiner*—Rebecca D. Gass
*Attorney, Agent, or Firm*—Cushman, Darby & Cushman

[57] ABSTRACT

An objective lens system for endoscopes comprising a first lens group having positive refractive power, a second lens group having negative refractive power and a third lens group having positive refractive power, and being so adapted as to permit focusing and at the same time observation at a magnification level different from ordinary magnification level matched with distance to an object to be observed.

8 Claims, 8 Drawing Figures

FOCUSING OBJECTIVE LENS SYSTEM FOR ENDOSCOPES

BACKGROUND OF THE INVENTION (a) Field of the Invention

The present invention relates to an objective lens system for endoscopes, and more specifically to an objective lens system so adapted as to perform focusing and at the same time adjustment of magnification to a level different from the ordinary magnification level matched with the distance to an object to be observed.

(b) Description of the Prior Art

For observation through an endoscope, the following functions are desirable for the observer: For observing an object located at a long distance, the endoscope should desirably permit the observer to observe a sufficiently wide range so as to complete observation in a short time without looking over abnormal portion. Further, the endoscope should desirably enable the observer to judge the location of the portion he is observing. For observing an object located at a short distance, on the other hand, the endoscope should desirably permit the observer to observe it at a sufficient magnification level for observing details of abnormal portion at a magnified scale and to provide sufficiently magnified even for locations near which the fiber scope cannot be brought.

In order to satisfy the desire for observing an object located at a long distance, among the two desires mentioned above, the endoscope requires an objective lens system having a short focal length, whereas it requires an objective lens system having a long focal length to meet the desire for observing an object located at a short distance.

Since it is very difficult to satisfy these two contradictrory desires at the same time, there have heretofore been known no objective lens systems for endoscopes that can satisfy the two desires at the same time. Though it is possible to satisfy the two desires at the same time by adopting a zoom lens system, it requires zooming operation and focusing operation which must be performed separately. In case of an endoscope which cannot be kept in fixed condition, however, it is difficult for the observer to perform both the zooming operation and focusing operation at the same time. Moreover, it is difficult from the technological viewpoint to arrange mechanisms for zooming and focusing respectively within a thin endoscope.

SUMMARY OF THE INVENTION

A primary object of the present invention is to provide an objective lens system for endoscopes comprising three positive, negative and positive lens groups, and so adapted as to permit focusing said lens system and at the same time changing magnification to a level different from the ordinary magnification level matched with the distance to an object to be observed.

Another object of the present invention is to provide an objective lens system for endoscopes having the afore-mentioned composition and so adapted as to permit changing magnification level alone for observing an object located at a long distance.

DESCRIPTION OF THE PREFERRED EMBODIMENT

Figure 1A:
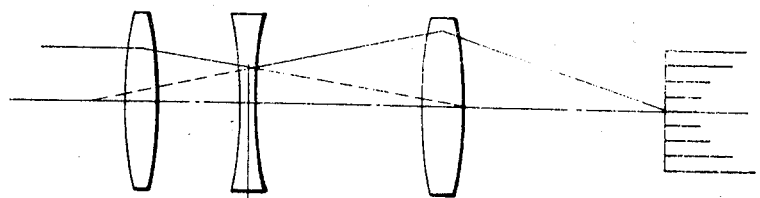
FIG. 1A and FIG. 1B show sectional views illustrating the composition of the objective lens system according to the present invention.
Figure 1B:
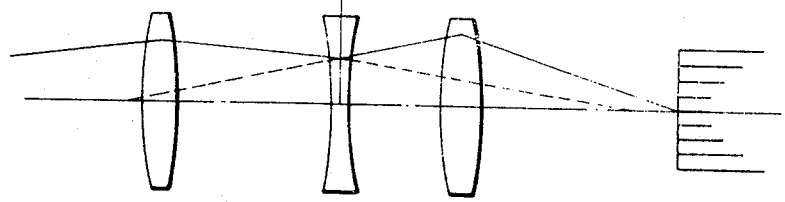

Now, the objective lens system for endoscopes according to the present invention will be described more detailedly with reference to the accompanying drawings. In a lens system comprising, as shown in FIG. 1A and FIG. 1B, a first lens group having positive refractive power, a second lens group having negative refractive power and a third lens group having positive refractive power, let us assume that said second lens group is to be displaced so as to form an image always at a constant position when an object to be observed displaces from the location at a long distance shown in FIG. 1A to that at a short distance shown in FIG. 1B. In this case, the following three relations establish:

$$f_1 \cdot \beta_2 \cdot \beta_3 = f_0 \quad (1)$$
$$\frac{f_1}{x_0} \cdot \beta_2' \cdot \beta_3 = \beta_0 \quad (2)$$
$$\Delta = f_2(\beta_2' - \beta_2) \quad (3)$$

wherein the reference symbol $f_1$ represents focal length of the first lens group, the reference symbol $-f_2$ designates focal length of the second lens group, the reference symbol $f_0$ denotes focal length of the entire lens system when it is set for observing an object located at infinite distance, the reference symbol $-\beta_2$ reference magnification level of the second lens group when the lens system is set for observing an object located at infinite distance, the reference symbol $-\beta_3$ designates magnification level of the third lens group when the lens system is set for observing an object located at infinite distance, the reference symbol $-\beta'_2$ denotes magnification level of the second lens group when the lens system is set for observing an object located at the shortest distance, the reference symbol $-\beta_0$ represents magnification level of the entire lens system when it is set for observing an object located at shortest distance, the reference symbol $-x_0$ designates distance as measured from the front focal point of the first lens group to the object to be observed and the reference symbol Δ denotes displacement of the second lens group.

From the formulae (1) and (2) mentioned above, $\beta_0$ is given by the following equation:

$$\beta_0 = \frac{f_0}{x_0} \left( \frac{\beta_2'}{\beta_2} \right) \qquad (4)$$

Further, by transforming the afore-mentioned formula (3), Δ can be expressed as follows:

$$\Delta = f_2 \cdot \beta_2 \{(\beta_2'/\beta_2) - 1\} \qquad (5)$$

In the formula (4) defined above, value of $f_0$ is to be determined at initial designing stage depending on size of the fiber bundle end face and the observation range (angle of field) desired for the endoscope of interest.

Further, value of $x_0$ is determined depending on location of use, for example, interiors of man's organs (stomach, etc.) and shape of the tip of the endoscope of interest. After $f_0$ and $x_0$ have been determined in this way, it is necessary to select a large value of $\beta_2'/\beta_2$ as understood from the formula (4) in order to enhance magnification level $\beta_0$ for observing an object located at the shortest distance. In addition, when a certain type of objective lens system is selected for designing, focal length $f_0$ of the entire lens system and distance $x_0$ as measured from the front focal point of the first lens group to the object to be observed with the lens system set for observing an object located at the shortest distance are generally determined at nearly fixed values depending on natures such as size of the fiber bundle end face and angle of field required for the objective lens system of interest. It is considered that magnification levels of objective lens systems usually employed are nearly equal to $f_0/x_0$. Since the objective lens system according to the present invention is so adapted as to displace the second lens group in the lens system as described above and has a magnification level $\beta_0$ expressed by the formula (4), it is required to design the lens system so as to satisfy a condition of $\beta_2'/\beta_2 > 1$ in order to give it a value of $\beta_0$ which is larger than those of ordinary objective lens systems.

In case where the second lens group is displaced for focusing as in the objective lens system according to the present invention, it is required to maintain the image formed by the second lens group at a constant position in order to maintain the image formed by the entire lens system at a constant position, i.e., on the end surface of the fiber bundle. In order to maintain the image formed by the second lens group at a constant position, the distance L as measured from the position of the image formed by the first lens group (the object point of the second lens group) to the image position of the second lens group must be prolonged as the object to be observed is brought nearer the objective lens system. When the distance between the front focal point and rear focal point of the second lens group is represented by a reference symbol $\overline{FF'}$, value of L can be expressed by the following formula (6):

$$L = f_2 \left( \beta + \frac{1}{\beta} \right) + \overline{FF'} \qquad (6)$$

wherein the reference symbol $\beta$ represents magnification level of the second lens group which is equal to $\beta_2 (\beta = \beta_2)$ when the lens system is set for observing an object located at infinite distance or equal to $\beta_2'(\beta = \beta_2')$ when the lens system is set for observing an object located at the shortest distance $(-x_0)$.

Figure 2:
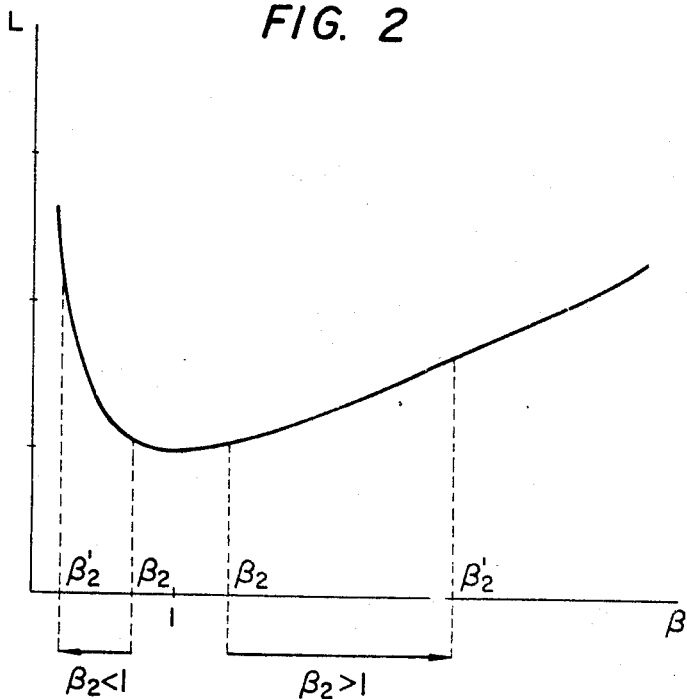
FIG. 2 shows a graph illustrating relationship between magnification level of the second lens group and distance as measured from the object observed through the second lens group (i.e., the position of the image formed by the first lens component) to the image formed by said lens group.

The relationship expressed by the formula (6) can be visualized by a graph shown in FIG. 2. As is clear from this graph, value of L is the smallest at a point of $\beta = 1$, and increases as $\beta$ has a larger or smaller value. For focusing the lens system, it is therefore necessary to select a relationship of $\beta_2 > \beta_2'$ within a range of where $\beta$ is smaller than 1, whereas a relationship $\beta_2 > \beta_2'$ within a range where $\beta$ is larger than 1. In order to set the lens system at a magnification level higher than that for ordinary observation as is mentioned as an object of the present invention, however, it is required to satisfy the condition of $\beta_2'/\beta_2 > 1$ as already described and, hence, $\beta_2$ must have a value within the range defined by the following formula (7):

$$\beta_2' > \beta_2 \geq 1 \qquad (7)$$

In case where the lens system consists of three positive, negative and positive lens groups, and is brought into focused condition by displacing the second lens group, it is possible to focus said lens system and, at the same time, set it at a magnification level higher than those of ordinary objective lens systems by designing the second lens group so as to have a magnification level satisfying the condition which is defined by the formula (7). In the vicinity of $\beta_2 \approx 1$, however, displacement of the second lens group changes its magnification level but scarcely influences on focusing condition of the lens system. It is therefore considered that only the magnification level of the lens system can be changed within this range with no relation to focusing condition. In addition, since $\beta_2 \approx 1$ corresponds to wide angles of the objective lens system, it is possible to set it for a high magnification level for observation at a relatively wide angle of field. Let us now consider displacement of the focal point when magnification level of the second lens group is changed in the vicinity of $\beta_2 \approx 1$. Newton's formula permits deriving displacement $\Delta'$ of the focal point as expressed by the formula (8) below:

$$\Delta' = \beta_3^2 f_2 \left( \beta_2 + \frac{1}{\beta_2} - 2 \right) \qquad (8)$$

Figure 3:
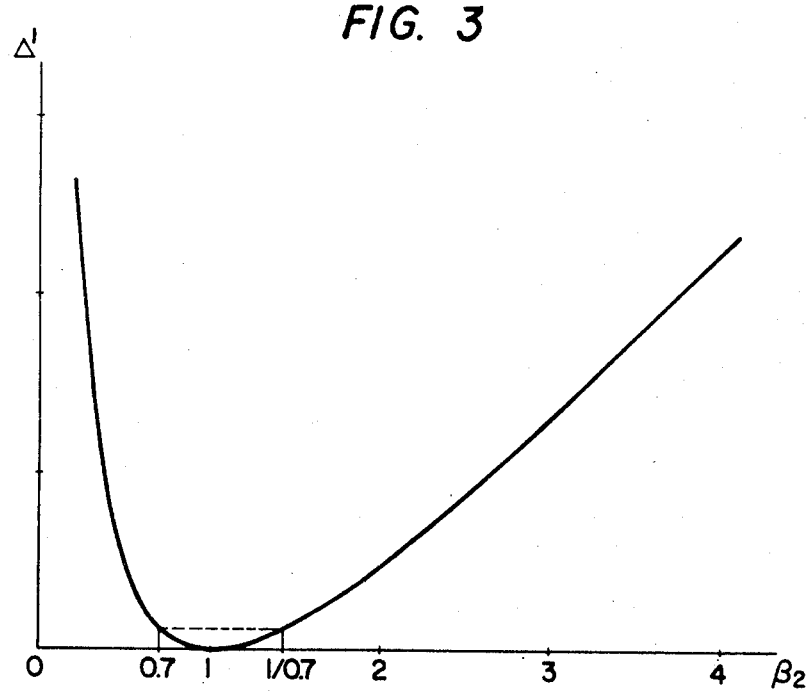
FIG. 3 shows a graph visualizing relationship between magnification level of the second lens group and displacement of focal point of said lens group.

The relationship expressed by this formula can be visualized in the form of a graph as shown in FIG. 3. So for as $\Delta'$ is located within the depth of focus of the objective lens system, it is possible to change only magnification level without affecting the focusing condition apparently. Objective lens systems for endoscopes are usually designed for aperture ratios of approximately F/3 and depths of focus of approximately 0.2 mm. In the objective lens system according to the present invention, on the other hand, displacement $\Delta'$ of the focal point is 0.192 and is within the range of the depth of focus on the assumption of $f_2 = 1.5$ and $\beta_3 = 1$ when magnification level is changed within a range of $\beta_2 = 0.7 \sim 1/0.7$.

Since $\beta_3$ can have various values, range of $\beta_2$ which is variable with the value of $\beta_3$ may be deviated from 0.7 to 1/0.7. In case where $\beta_3$ has a value close to 1, however, such a value of $\beta_3$ is preferable since it enables to design the entire lens system compact. Speaking more concretely, with reference to FIG. 1, distance l as measured from the third lens group to the end surface of the fiber bundle is given by $l=f_3(1+\beta_3)$. l should preferably have a value as small as possible to shorten the distal end of the endoscope. Though $f_3$ should have a small value for this purpose, it cannot have too small a value since such a value of $f_3$ will give too strong power to the third lens group which will in turn aggravate aberrations, especially astigmatism (a larger value of $f_3$ is more advantageous to correct aberrations). Accordingly, it is conceivable to shorten l by giving a small value to $\beta_3$. However, too small a value of $\beta_3$ will unavoidably prolong the entire lens system, thereby extending the distal end thereof. In view of the above-described facts, the distal end can be made shortest to permit designing a compactest endoscope without aggravating aberrations when $\beta_3$ has a value of 1. Moreover, $f_2$ should desirably have a value as small as possible from a viewpoint to minimize displacement required for the second lens group, but too small a value of $f_2$ will enlarge angle of field for the second lens group, which will in turn aggravate astigmatism. Taking this fact into consideration, adequate value for $f_2$ is on the order of 1.5.

As is clear from the foregoing descriptions, it is possible to vary only magnification level within a range of $1/0.7>\beta_2 \geq 0.7$ in which an image of object is located with the depth of focus. In a range of $1 \geq \beta_2 \geq 0.7$ within that defined by the above-mentioned formula, it is possible to vary only magnification level though focusing cannot be performed. In a range of $1/0.7>\beta_2>1$, though it is possible to perform focusing and at the same time inhancement of magnification to a level higher than usual, the focusing condition remains unchanged apparently when only magnification level is changed (for example, with the distance to the object to be observed unchanged) without performing the focusing operation. In other words, it is possible, within the range of $1/0.7>\beta_2>1$, to observe an object located at a long distance at a magnification level higher than usual independently of the focusing condition.

As is understood from the foregoing descriptions, the objective lens system according to the present invention permits focusing and at the same time observing at a magnification level higher than its ordinary level matched with the distance to be observed when magnification level $\beta_2$ of the second lens group is selected within the range (i) defined below by displacing said second lens group, and further changing the magnification level alone when magnification level $\beta_2$ of the second lens group is selected within the range (ii) defined below by displacing said second lens group.

$$\beta'_2 > \beta_2 \geq 1 \quad \text{(i)}$$

$$1 \geq \beta_2 \geq 0.7 \quad \text{(ii)}$$

Objective lens systems for endoscopes currently employed are designed for magnification levels on the order of 0.65 for observing objects located at short distances and have angles of field on the order of 50°. In contrast, the present invention makes it possible to design an objective lens system having a field angle of about 70° and a magnification level around 0.65 by selecting a relationship of $\beta'_2/\beta_2>1$. When it is desired to set this objective lens system at a magnification level of about 1×, selecting relationship of $\beta'_2/\beta_2>1.5$ can provide a magnification level of $1.5\times0.65$ as an overall magnification level exceeding 1. Therefore, the objective lens system according to the present invention can have an angle of field far larger than those of the conventional objective lens systems in combination with a magnification level equal to that of the conventional objective lens systems. Further, the objective lens system having such a large angle of field can have a magnification level higher than 1× which is very desirable for minute observations of abnormal portions.

In the next place, displacement $\Delta$ of the second lens group is given by the formula (5). However, displacement $\Delta$ should desirably be as short as possible since distal end of an endoscope comprising the objective lens system must be as short as possible. From the viewpoint of magnification, $\beta'_2/\beta_2$ should desirably have a value as large as possible, but a value exceeding 5 of $\beta'_2/\beta_2$ will unavoidably prolong the distal end. In view of this fact, it is preferable to select value of $\beta'_2/\beta_2$ within a range of $1<\beta'_2/\beta_2<5$. For the same reason, $\beta_2$ should desirably have a value smaller than 2. When the objective lens system is so designed as to permit focusing and setting at a magnification level higher than the ordinary level at the same time, it is most desirable to select, value of $\beta_2$ within a range of $1<\beta_2<2$. In order to add a function to change magnification level alone to the objective lens system permitting both the above-mentioned operations while it is focused on an object located at a long distance, a range of $0.7<\beta_2<2$ will be optimum.

Figure 4:
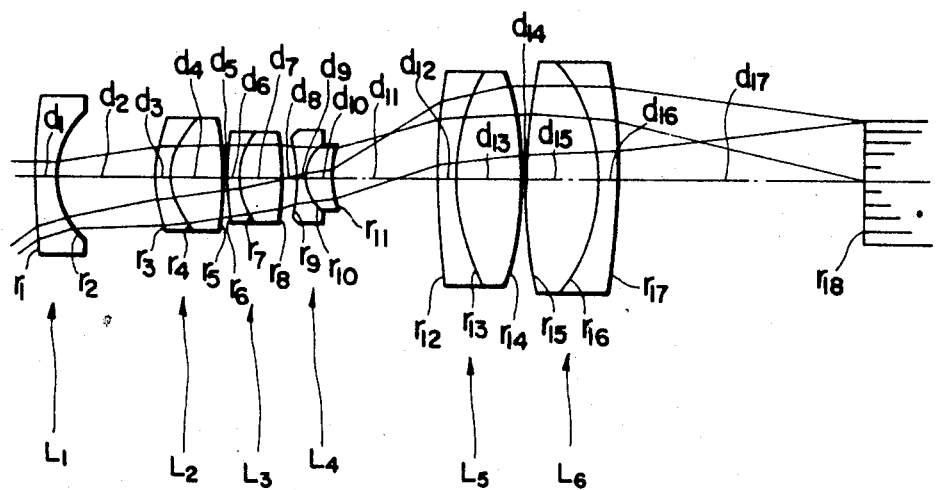
FIG. 4 illustrates a sectional view clarifying the composition of an objective lens system preferred as an embodiment of the present invention.

Now, a preferred embodiment of the present invention will be described. Shown in FIG. 4 is an objective lens system comprising a first lens group consisting of a negative lens component $L_1$, a positive cemented doublet component $L_2$ and a positive cemented doublet component $L_3$, a second lens group consisting only of a negative cemented doublet component $L_4$, and a third lens group consisting of a positive cemented doublet component $L_5$ and a positive cemented doublet component $L_6$, and so adapted as to permit displacing said second lens group $L_4$, said objective lens system having the following numerical data:

$r_1 = \infty$
  $d_1 = 0.34$, $n_1 = 1.80400$, $\nu_1 = 46.6$
$r_2 = 1.564$
  $d_2 = 1.69$
$r_3 = 3.399$
  $d_3 = 0.23$, $n_2 = 1.80610$, $\nu_2 = 40.9$
$r_4 = 1.296$
  $d_4 = 0.86$, $n_3 = 1.69895$, $\nu_3 = 30.1$
$r_5 = -7.340$
  $d_5 = 0.1$
$r_6 = 8.868$
  $d_6 = 0.23$, $n_4 = 1.74000$, $\nu_4 = 28.3$
$r_7 = 1.262$
  $d_7 = 0.86$, $n_5 = 1.69680$, $\nu_5 = 55.5$
$r_8 = -2.382$
  $d_8$ (variable)
$r_9 = -3.049$
  $d_9 = 0.2$, $n_6 = 1.78590$, $\nu_6 = 44.2$
$r_{10} = 0.785$
  $d_{10} = 0.39$, $n_7 = 1.74000$, $\nu_7 = 28.3$
$r_{11} = 2.060$
  $d_{11}$ (variable)
$r_{12} = 14.000$
  $d_{12} = 0.34$, $n_8 = 1.74000$, $\nu_8 = 28.3$
$r_{13} = 3.924$
  $d_{13} = 1.11$, $n_9 = 1.80610$, $\nu_9 = 40.9$
$r_{14} = -6.201$
  $d_{14} = 0.09$
$r_{15} = 10.370$ $d_{15} = 1.29$, $n_{10} = 1.74400$, $\nu_{10} 44.7$
$r_{16} = -3.070$
$d_{16} = 0.34$, $n_{11} = 1.74000$, $\nu_{11} = 28.3$
$r_{17} = -11.527$
$d_{17} = 7.06$
$r_{18} = \infty$ $f = 1.958$ (distance to object 40 mm)
$f_1 = 1.962$, $-f_2 = -1.622$, $f_3 = 3.704$
$-\beta_2 = -0.843$, $-\beta_3 = -1.184$, $-\beta'_2 = -2.41$
$fB_1 = 3.959$ wherein the reference symbol $r_1$ through $r_{18}$ represent radii of curvature on the surfaces of the respective lens elements, the reference symbols $d_1$ through $d_{17}$ designate thicknesses of the respective lens elements and airspaces reserved therebetween, the reference symbols $n_1$ through $n_{11}$ denote refractive indices of the respective lens elements and the reference symbols $\nu_1$ through $\nu_{11}$ represent Abbe's numbers of the respective lens elements.

In the above-mentioned embodiment, displacement of the second lens group (variations of airspaces $d_8$ and $d_{11}$) and magnification level of the objective lens system changed depending on distances to the object to be observed are summarized as listed below:

|     | Distance to Object | $d_8$ | $d_{11}$ | Magnification Level |
| --- | --- | --- | --- | --- |
| (1) | 40 mm | 0.253 | 2.895 | −0.047 |
| (2) | 40 mm | 0.906 | 2.242 | −0.070 |
| (3) | 20 mm | 1.135 | 2.013 | −0.16 |
| (4) | 2.33 mm | 2.837 | 0.311 | −1.997 |

In (1) and (2) above, magnification level only is changed.

In the above-described embodiment, the first lens group is of retrofocus type. When a retrofocus type of first lens group is employed as exemplified above, it is possible to reduce the angle formed between the principal ray and the optical axis, thereby correcting curvature of field and astigmatism favorably. The retrofocus type of first lens group further makes it possible to reserve a long back focal length as an advantage to permit prolonging the focal length of the second lens group which in turn is preferable to correct aberrations. Especially when the lens system is so designed as to satisfy a condition of $fB_1/f_1 > 1.5$, curvature of field and astigmatism can be corrected favorably. In the above condition, reference symbol $f_1$ represents focal length of the first lens group and reference symbol $fB_1$ represents back focal length of the first lens group.

In the above-described embodiment, each lens group comprises a cemented doublet component for correcting chromatic aberration in each lens group. When a lens group is displaced as with the case of the objective lens system according to the present invention, aberrations are changed accordingly. In order to prevent such influence, the cemented doublet component is arranged in each lens group to correct aberrations in each lens group.

Figure 5:
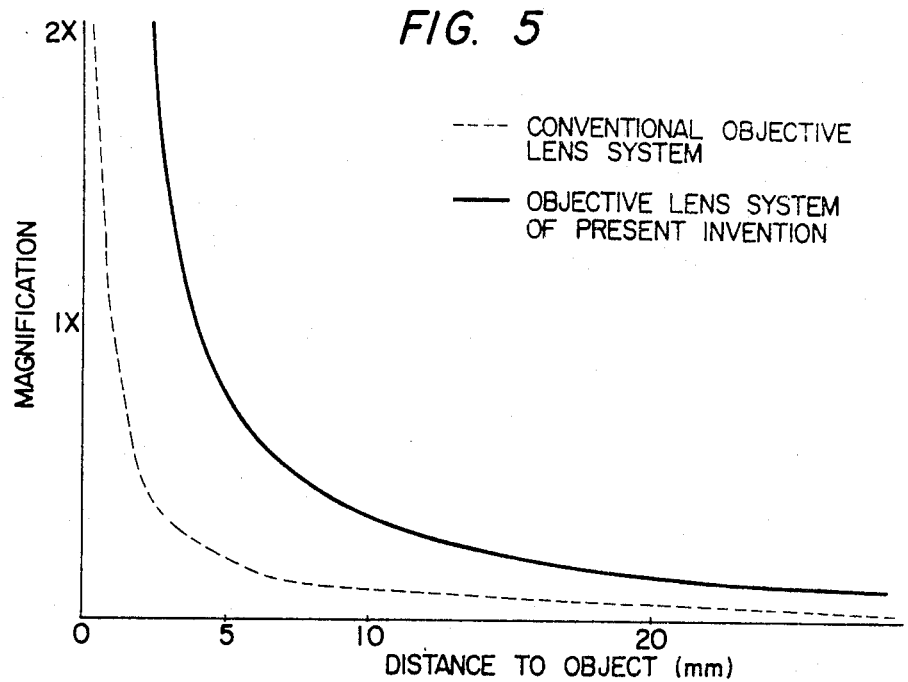
FIG. 5 illustrates a curve showing relationship between distance to the object to be observed and magnification level of the entire objective lens system.
Figure 6:
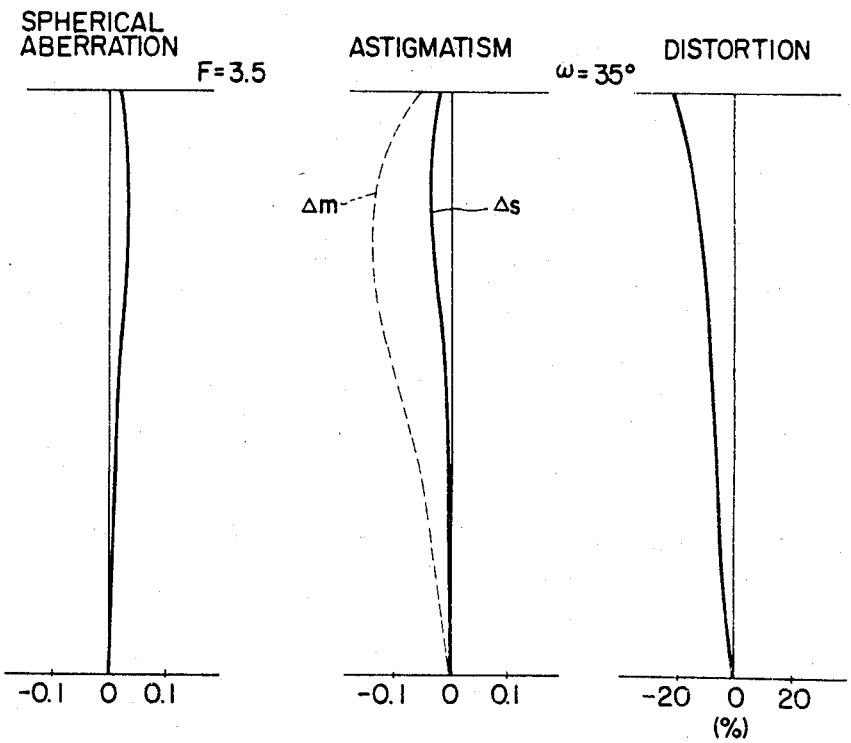
FIG. 6 shows curves visualizing aberration characteristics of the embodiment of the present invention when it is set for observing an object located at a long distance.
Figure 7:
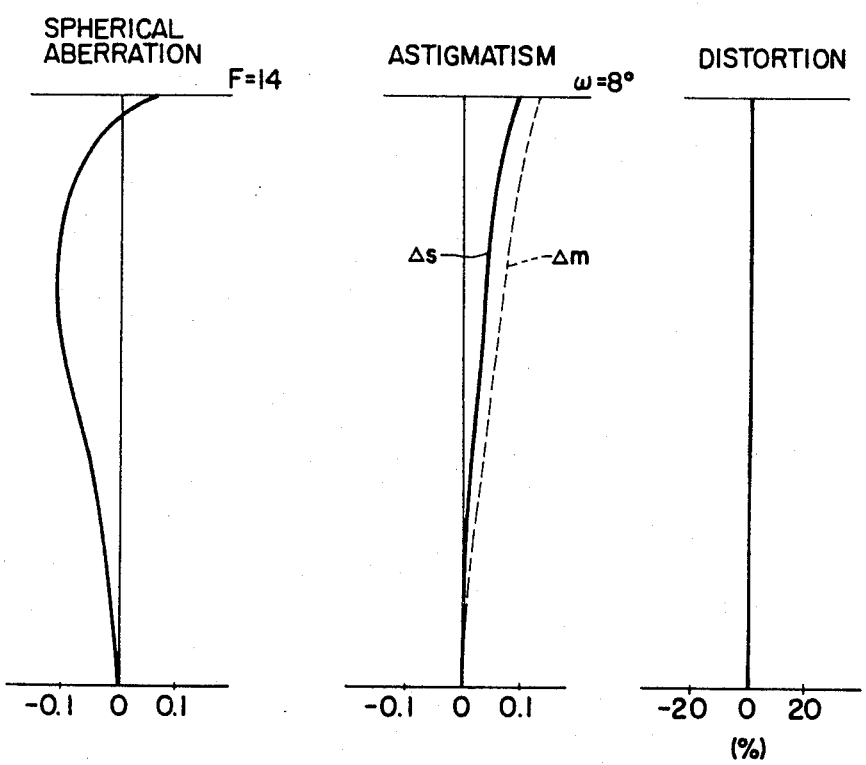
FIG. 7 shows curves illustrating aberration characteristics of the embodiment when it is set for observing an object located at a short distance.

Aberration characteristics of the embodiment are shown in FIG. 6 and FIG. 7, the former illustrating the aberration characteristics when the lens system is set for observing an object located at a long distance, whereas the latter illustrating those obtained when the lens system is set for observing an object located at a short distance. Further, FIG. 5 compares magnification levels of the embodiment changed depending on distances to an object to be observed with those of the conventional objective lens system which has the same composition as that of the lens system according to the present invention and in which the entire lens system is displaced for focusing. As is clear from this figure, the objective lens system according to the present invention can provide magnification levels higher than those of the conventional ones.

As is understood from the foregoing descriptions made with reference to the embodiment, the objective lens system according to the present invention permits focusing and observation at a magnification level higher than the ordinary level at the same time, thereby making it possible to observe a wide range of area located at a long distance, and an object located at a short distance in favorably focused condition and at a high magnification level. The objective lens system further permits changing magnification level alone in observing an object located at a long distance. The lens system according to the present invention can advantageously usable as an objective lens system for endoscopes.

Though the foregoing descriptions have been made only on a case where magnification is changed to a level higher than the ordinary level simultaneously with focusing, it is possible to change magnification to a level lower than the ordinary level by selecting $\beta_2 > \beta'_2$. It is needless to say that this method is applicable also to lens systems other than objective lens systems for endoscopes.

We claim:

1. An objective lens system for endoscopes comprising a first lens group having positive refractive power, a second lens group having negative refractive power and a third lens group having positive refractive power, and being so adapted as to effect focusing and changing of magnification level at the same time by displacing said second lens group along the optical axis, said objective lens system for endoscopes satisfying the following condition:

$$1 < \beta_2 < \beta'_2$$

wherein the reference symbol $\beta_2$ represents magnification level of said second lens group when the objective lens system is set for observing an object located at infinite distance and the reference $\beta'_2$ designates magnification level of said second lens group when the objective lens system is set for observing an object located at the shortest distance.

2. An objective lens system for endoscopes according to claim 1 wherein each of said first, second and third lens groups comprises at least one cemented doublet component respectively.

3. An objective lens system for endoscopes according to claim 1 wherein said first lens group is designed as retrofocus type.

4. An objective lens system for endoscopes according to claim 1 satisfying the following condition:

$$fB_1/f_1 > 1.5$$

wherein the reference symbol $f_1$ represents focal length of said first lens group and the reference symbol $f_{B1}$ designates back focal length of said first lens group.

5. An objective lens system for endoscopes according to claim 1 wherein said third lens group is an image formation system having a magnification level of approximately $1\times$.

6. An objective lens system for endoscopes according to claim 1 satisfying the following condition:

$1 < \beta_2 < 2$ $1 < \beta'_2/\beta_2 < 5$ wherein the reference symbol $\beta_2$ represents magnification level of said second lens group when the objective lens system is set for observing an object located at infinite distance and the reference symbol $\beta'_2$ designates magnification level of said second lens group when the objective lens system is set for observing an object located at the shortest distance.

7. An objective lens system for endoscopes according to claim 1 so adapted as to permit changing of magnification level alone when said objective lens system is set for observing an object located at a long distance, said objective lens system for endoscopes satisfying the following condition:

$0.7 < \beta_2 < \beta'_2$.

8. An objective lens system for endoscopes according to claim 7 satisfying the following conditions:

$0.7 < \beta_2 < 2$ $1 < \beta'_2/\beta_2 < 5$ wherein the reference symbol $\beta_2$ represents magnification level of said second lens group when the objective lens system is set for observing an object located at infinite distance and the reference symbol $\beta'_2$ designates magnification level of said second lens group when the objective lens system is set for observing an object located at the shortest distance.

* * * * *